United States Patent
Han

(10) Patent No.: US 8,571,129 B2
(45) Date of Patent: Oct. 29, 2013

(54) PORTABLE TERMINAL AND METHOD FOR OPERATING OF MIMO ANTENNA THEREOF

(75) Inventor: Kyu Sung Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 13/085,307

(22) Filed: Apr. 12, 2011

(65) Prior Publication Data

US 2011/0249765 A1  Oct. 13, 2011

(30) Foreign Application Priority Data

Apr. 12, 2010 (KR) .................. 10-2010-0033245

(51) Int. Cl.
*H04B 7/02* (2006.01)

(52) U.S. Cl.
USPC ........... 375/267; 375/260; 375/316; 375/347; 375/349

(58) Field of Classification Search
USPC .................. 375/316, 260, 267, 347, 349
See application file for complete search history.

(56) References Cited

U.S. PATENT DOCUMENTS

| | | | |
|---|---|---|---|
| 4,977,616 A * | 12/1990 | Linder et al. ............... | 455/277.2 |
| 7,187,945 B2 | 3/2007 | Ranta et al. | |
| 8,208,886 B2 * | 6/2012 | Baker ........................ | 455/277.1 |
| 2005/0254608 A1 * | 11/2005 | Lee et al. ...................... | 375/347 |
| 2007/0115801 A1 * | 5/2007 | Li et al. ........................ | 370/208 |
| 2008/0261647 A1 * | 10/2008 | Hamada ..................... | 455/550.1 |
| 2010/0009649 A1 * | 1/2010 | Huebner et al. ............ | 455/334 |
| 2010/0246496 A1 * | 9/2010 | Yurugi et al. ................ | 370/328 |
| 2010/0319033 A1 * | 12/2010 | Auranen et al. ............... | 725/62 |
| 2011/0149918 A1 * | 6/2011 | Gong et al. .................. | 370/336 |

* cited by examiner

*Primary Examiner* — Siu Lee

(57) ABSTRACT

A portable terminal and a method operate multiple input multiple output (MIMO) antennas. Received signal strength indications (RSSIs) of the MIMO antennas are measured through a wireless communication unit that transmits and receives a wireless signal using the MIMO antennas. A path between a MIMO antenna with a greatest RSSI and a broadcast receiving unit is connected during a broadcast mode.

20 Claims, 4 Drawing Sheets

ND METHOD FOR
PORTABLE TERMINAL AND METHOD FOR
OPERATING OF MIMO ANTENNA THEREOF

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Apr. 12, 2010 and assigned Serial No. 10-2010-0033245, and the entire disclosure of which is hereby incorporated by reference.

TECHNICAL FIELD OF THE INVENTION

The present invention relates to a portable terminal and a method of operating a Multiple Input Multiple Output (MIMO) antenna and, more particularly, to a portable terminal capable of receiving a digital broadcast using a MIMO antenna for high data communication and a method for operating a MIMO antenna.

BACKGROUND OF THE INVENTION

A portable terminal is a terminal that may support various functions based on mobility and has been used in very wide fields due to its convenience and easy portability. The portable terminal provides various functions such as a short message transmitting/receiving function, a photographing function, a music listening function, a digital broadcasting service function, an E-mail service function, and an Instant Messenger service function, among others.

In the meantime, a portable terminal has been developed to provide a voice service as a main service. However, due to an increased demand for multi-media of high quality, a recent portable terminal has been switched to a data service as a main service. Accordingly, a technology that supports wireless communication of high speed/high capacity has been developed. Multiple Input Multiple Output (MIMO) technology is one of the techniques that support wireless communication of high speed/high capacity. A portable terminal that supports MIMO technology may have a plurality of antennas. However, a recent miniaturized and slimmed portable terminal lacks mounting space for a plurality of antennas. In particular, a portable terminal that supports a digital broadcasting service should have an antenna to receive a digital broadcast as well as a MIMO antenna. This increases the problem of having space that is too narrow for mounting a plurality of antennas in a small portable terminal. Furthermore, when a spacing distance between the MIMO antenna and an antenna for receiving a digital broadcast is insufficient, interference occurs between the MIMO antenna and the antenna for receiving a digital broadcast. This deteriorates a wireless signal transmitting/receiving performance of the portable terminal.

SUMMARY OF THE INVENTION

To address the above-discussed deficiencies of the prior art, it is a primary object to provide a portable terminal capable of receiving digital broadcasting using a MIMO antenna without adding an antenna for receiving the digital broadcasting, and a method for operating of a MIMO antenna thereof.

The present invention further provides a portable terminal capable of improving broadcast receiving performance by receiving digital broadcasting using a MIMO antenna, and a method for operating of a MIMO antenna.

In accordance with an aspect of the present invention, a method for operating a portable terminal with multiple input multiple output (MIMO) antennas is provided. The method includes measuring received signal strength indications (RSSIs) of the MIMO antennas through a wireless communication unit that transmits and receives a wireless signal using the MIMO antennas. A path between a MIMO antenna with a greatest RSSI and a broadcast receiving unit is connected during a broadcast mode.

In accordance with another aspect of the present invention, a portable terminal with multiple input multiple output (MIMO) antennas is provided. The portable terminal includes a wireless communication unit for transmitting and receiving a wireless signal through the MIMO antennas. A broadcast receiving unit receives a broadcasting signal through the MIMO antennas. A switch unit provided between the MIMO antennas and the broadcast receiving unit connects or intercepts paths between the MIMO antennas and the broadcast receiving unit. A controller measures RSSIs of the MIMO antennas through the wireless communication unit and controls the switch unit to connect a MIMO antenna with a greatest RSSI and the broadcast receiving unit during a broadcast mode.

In accordance with yet another aspect of the present invention, an apparatus in a portable terminal for operating a multiple input multiple output (MIMO) antenna is provided. The apparatus includes a plurality of antennas of the MIMO antenna for transmitting and receiving wireless signals. A broadcast receiving unit receives a broadcasting signal through the antennas during a broadcast mode. A wireless communication unit transmits and receives signals through the antennas and measures received signal strength indications (RSSIs) of the antennas. A controller connects an antenna with a greatest RSSI and the broadcast receiving unit during the broadcast mode.

As described above, because a portable terminal and a method for operating of a MIMO antenna thereof according to an embodiment of the present invention use a MIMO antenna for wireless communication for receiving digital broadcasting, an antenna for receiving the digital broadcasting is additionally provided such that the portable terminal may be miniaturized and slimmed. Further, because the portable terminal does not include a separate antenna for receiving digital broadcasting, a cost of the portable terminal may be reduced. In addition, the present invention may receive a digital broadcasting signal using a MIMO antenna to improve broadcast receiving performance.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. The same reference numbers are used throughout the drawings to refer to the same or like parts. Detailed descriptions of well-known functions and structures incorporated herein may be omitted to avoid obscuring the subject matter of the present invention.

A portable terminal according to an embodiment of the present invention may include a terminal with a Multiple Input Multiple Output (MIMO) for high speed data communication, and include a mobile communication terminal, a personal digital assistant (PDA), a smart phone, a portable multimedia player (PMP), and a navigation terminal. Hereinafter, for convenience of the description, a mobile communication terminal is described by way of example.

Figure 1:
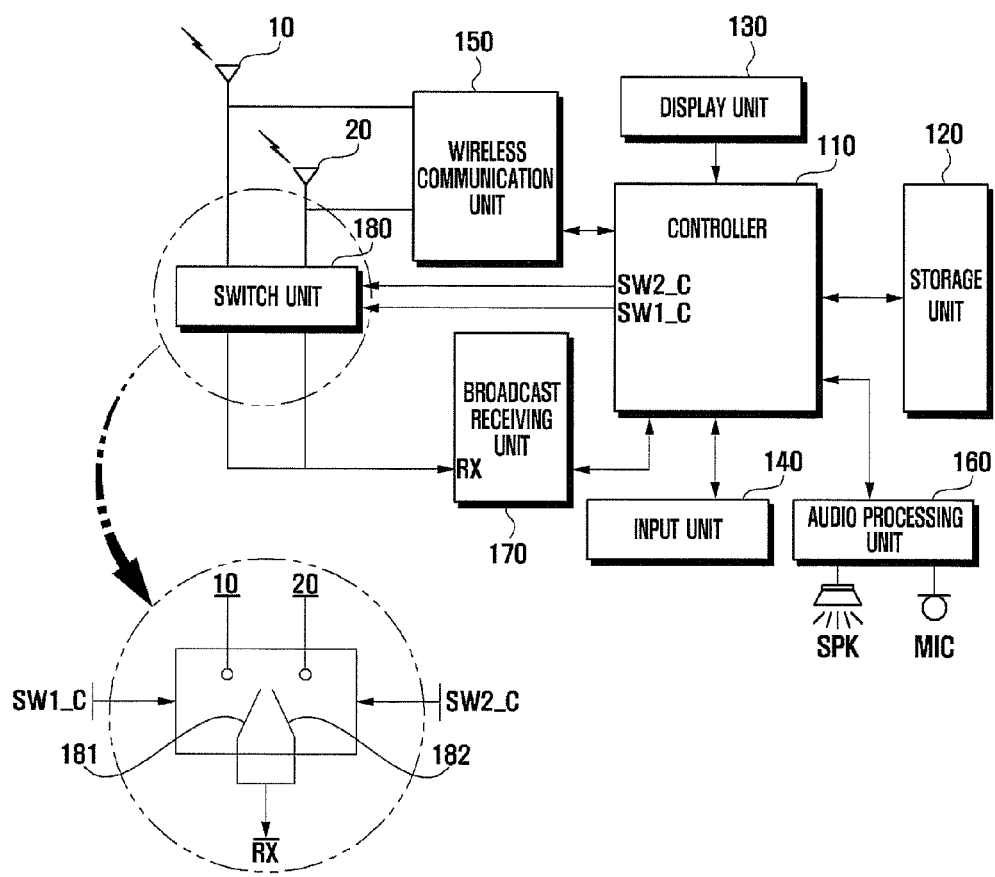
FIG. 1 is a block diagram schematically illustrating a configuration of a portable terminal with one receiving terminal according to an embodiment of the present invention.

FIG. 1 is a block diagram schematically illustrating a configuration of a portable terminal with one receiving terminal according to an embodiment of the present invention.

Referring to FIG. 1, the portable terminal, according to an embodiment of the present invention, may include MIMO antennas 10 and 20, a controller 110, a storage unit 120, a display unit 130, an input unit 140, a wireless communication unit 150, an audio processing unit 160, a broadcast receiving unit 170, and a switch unit 180. When the portable terminal provides only a touch screen to generate an input signal, the input unit 140 may be omitted.

The portable terminal of the present invention that includes a configuration mentioned above controls the switch unit 180 to connect a path between the MIMO antennas 10 and 20 and the broadcast receiving unit 170 such that a digital broadcasting signal may be received when a broadcasting mode is active. When the broadcasting mode is inactive, an embodiment of the present invention controls the switch unit 180 to intercept the path between the MIMO antennas 10 and 20 and the broadcast receiving unit 170. Hereinafter, respective components of the portable terminal and functions thereof will be described in detail.

The MIMO antennas 10 and 20 may include a plurality of antennas to support high-speed data communication. The MIMO antennas 10 and 20 may transmit and receive a wireless signal for high-speed data communication. Upon activation of a broadcasting mode, the MIMO antennas 10 and 20 may receive a broadcasting signal for a digital broadcasting service. Here, the wireless signal may have a frequency band of 704-746 MHz of Long Term Evolution 17 (LTE 17). The broadcasting signal may have a frequency band of 716-722 MHz of Media Forward Link Only (MFLO). The present invention is not limited such that the MIMO antennas 10 and 20 transmit and receive only a wireless signal of an LTE 17 frequency band and a broadcasting signal of a frequency band of MFLO. That is, the MIMO antenna 10 and 20 may receive a wireless signal and a broadcasting signal of various frequency bands. It is preferred that each frequency band of the MIMO antennas 10 and 20 has a digital broadcasting frequency band. The MIMO antennas 10 and 20 may support various diversity technologies such as space diversity, time diversity, frequency diversity, and polarization diversity. Hereinafter, the MIMO antennas 10 and 20 which include a first antenna 10 and a second antenna 20 are described by way of example. However, the present invention is not limited thereto. That is, the MIMO antennas may include at least three antennas.

The wireless communication unit 150 forms a communication channel for a call and a communication channel for data transmission under the control of the controller 110. Namely, the wireless communication unit 150 forms a voice call channel, a data communication channel, and a video phone call channel between mobile communication systems. That is, the wireless communication unit 150 may include a transmitter (not shown) for up-converting a frequency of a transmitted signal and amplifying the signal, and a receiver (not shown) for low-noise-amplifying a received signal and down-converting the signal. In particular, when the broadcasting mode is activated, the wireless communication unit 150 may check respective received signal strength indications (RSSIs) of the MIMO antennas 10 and 20, and transmit and receive a broadcasting signal by using an antenna of a relatively higher RSSI. A detailed description thereof will be given with reference to the controller 110 and the switch unit 180 later. Meanwhile, when the respective RSSIs of the first antenna 10 and the second antenna 20 are less than a reference value, the wireless communication unit 150 may receive the digital broadcasting signal by using both of the first antenna 10 and the second antenna 20.

The input unit 140 may receive input and includes a plurality of input keys and functions keys for various functions. The function keys may include arrow keys, side keys, and hot keys set to execute specific functions. Furthermore, the input unit 140 generates a key signal associated with a user setting and function control of a terminal and provides the generated key signal to the controller 110. In particular, the input unit 140 may include a hot key (function key) for activating or deactivating the broadcasting mode. The input unit 140 may be implemented by a QWERTY key pad, a 3*4 key pad, a 4*3 key pad, an arrow key pad, a touch pad, or a touch screen including a plurality of keys.

The audio processing unit 160 includes a speaker (SPK) for playing audio data received during a call, and a microphone (MIC) for collecting user's voices or other audio signals during a call. The audio processing unit 160 may output a corresponding audio signal while a screen state is changing.

For example, the audio processing unit 160 may output an audio signal included in a broadcasting signal received from the MIMO antennas 10 and 20 through the speaker SPK.

The display unit 130 displays information input by a user and information provided to the user, as well as all types of menus and interfaces of the portable terminal. For example, the display unit 130 may provide various screens such as an idle screen, a menu screen, a message creation screen, a call screen, and a data communication screen according to use of the portable terminal. In particular, the display unit 130 of the present invention may display a broadcasting screen corresponding to a digital broadcasting signal received through the MIMO antennas 10 and 20. When the display unit 130 is provided in a touch screen form, it may execute a function of the input unit 140. The display unit 130 may be configured as a Liquid Crystal Display (LCD), an Organic Light Emitted Diode (OLED) display, or an Active Matrix Organic Light Emitted Diode (AMOLED) display.

The storage unit 120 may store application programs for operating the portable terminal according to an embodiment of the present invention. When the portable terminal includes a touch screen, the storage unit 120 may store a key map or a menu map for operating a touch screen. Here, the key map and the menu map may be configured in various forms. For example, the key map may include a 3*4 key map, a QWERTY key map, a control key map for controlling a currently activated application program, and/or a hot key map for activating or deactivating a broadcasting mode. Furthermore, the menu map may be for controlling a currently activated application program or a menu map that includes various items provided from the portable terminal. In particular, the storage unit 120 according to the present invention may include a program for controlling the switch unit 180 to connect or intercept a path between the MIMO antennas 10 and 20 and the broadcast receiving unit 170 according to activation or deactivation of the broadcasting mode.

The switch unit 180 connects or intercepts the path between the MIMO antennas 10 and 20 and the broadcast receiving unit 170 under the control of the controller 110. The switch unit 180 may include a first switch 181 for connecting or intercepting a path between a first antenna 10 and the broadcast receiving unit 170, and a second switch 182 for connecting or intercepting a path between a second antenna 20 and the broadcast receiving unit 170.

An ON or OFF state of the first switch 181 and the second switch 182 may be controlled according to activation or deactivation of a broadcasting mode. For example, when the broadcasting mode is deactivated, the first switch 181 and the second switch 182 switch to an OFF state. That is, a path between the MIMO antennas 10 and 20 and the broadcasting receiving unit 170 is intercepted. In the meantime, when the broadcasting mode is activated, a switch connected to an antenna with an RSSI switches to an ON state. For example, when an RSSI of the first antenna 10 is relatively good, the first switch 181 switches to an ON state and the second switch 182 switches to an OFF state. That is, the first antenna 10 and a receiving terminal Rx of the broadcast receiving unit 170 are connected through the first switch 181. In contrast, when the RSSI of the second antenna 20 is relatively good, the first switch 181 switches to an OFF state and the second switch 182 switches to an ON state. Namely, the second antenna 20 and a receiving terminal Rx of the broadcast receiving unit 170 are connected through the second switch 182.

In the meantime, a form of the switch unit 180 shown in FIG. 1 is merely one example and does not restrict the scope of the present invention. That is, the present invention may implement a switching circuit for connecting or intercepting a path between the MIMO antennas 10 and 20 and the broadcast receiving unit 170 using switches of various forms. For example, the present invention may use a switch including three input terminals and one output terminal. In this situation, a first input terminal of a switch is connected to the first antenna 10, a second input terminal of the switch is connected to the second antenna 20, and the third input terminal corresponds to an OFF state. In this embodiment, an output terminal of the switch connects with the broadcast receiving unit 170 such that the third input terminal of the switch connects with the output terminal when the broadcasting mode is deactivated. When the broadcasting mode is activated, RSSIs of the first antenna 10 and the second antenna 20 are compared with each other to connect the output terminal with the first input terminal or the second input terminal of the switch. When there are at least three antennas, the switch unit 180 may include at least three switches corresponding to the number of antennas.

The broadcast receiving unit 170 may transfer a digital broadcasting signal received from the MIMO antennas 10 and 20 to the controller 110. For example, the broadcast receiving unit 170 demodulates and transfers the digital broadcasting signal received from the first antenna 10 or the second antenna 20 to the controller 110.

Although not shown in FIG. 1, the portable terminal according to an embodiment of the present invention may further include a matching unit (not shown) for matching impedance between the switch unit 180 and the broadcast receiving unit 170. The matching unit may perform a function of a filter by passing only a broadcasting signal.

The controller 110 controls a supply of power to respective components of the portable terminal to perform an initialization procedure. When the initialization procedure is terminated, the controller 110 may control signal flow between the respective components. In particular, the controller 110, according to an embodiment of the present invention, may control the switch unit 180 to connect or intercept a path between the MIMO antennas 10 and 20 and the broadcast receiving unit 170. That is, the controller 110 may include a first control terminal SW1_C for controlling ON/OFF states of the first switch 181 and a second control terminal SW2_C for controlling ON/OFF states of the second switch 182. In detail, the controller 110 checks activation or deactivation of a broadcasting mode. When the broadcasting mode is deactivated, the controller 110 may control the first switch 181 and the second switch 182 of the switch unit 180 to an OFF state. Namely, when the broadcasting mode is deactivated, the controller 110 may control the switch unit 180 to intercept a path between the MIMO antennas 10 and 20 and the broadcast receiving unit 170. That is, the controller 110 may transmit a control signal, for turning off the first switch 181 and the second switch 182, to the switch unit 180 through a first control terminal SW1_C and a second control terminal SW2_C.

In contrast, when the broadcasting mode is activated, the controller 110 may check RSSIs of the first antenna 10 and the second antenna 20 by using the wireless communication unit 150 and control the switch unit 180 to connect the broadcast receiving unit 170 to an antenna with RSSI that meets a condition. For example, when an RSSI of the first antenna 10 is better than the second antenna 20, the controller 110 may turn on the first switch 181 and turn off the second switch 182. That is, the controller 110 may control the switch unit 180 to connect a receiving terminal Rx of the broadcast receiving unit 170 to the first antenna 10. In contrast, when an RSSI of the second antenna 20 is better than the RSSI of the first antenna 10, the controller 110 may turn off the first switch 181 and turn on the second switch 182. That is, the controller 110 may control the switch unit 180 to connect a receiving terminal Rx of the broadcast receiving unit 170 to the second antenna 20.

Next, the controller 110 may play a broadcasting signal received from the first antenna 10 or the second antenna 20 and control the display unit 130 to output a broadcasting screen corresponding to the broadcasting signal. When a broadcasting mode termination signal is received through the input unit 140 or a touch screen, the controller 110 may control the first switch 181 or the second switch 182 to be turned off.

Figure 2:
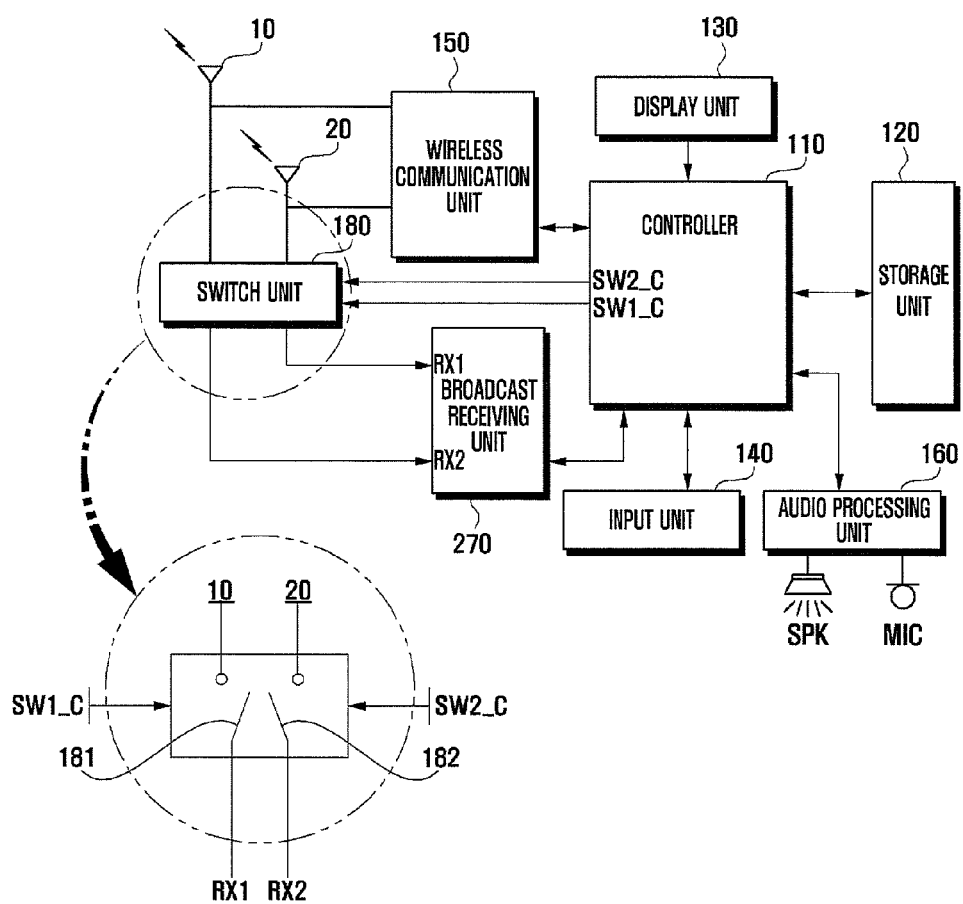
FIG. 2 is a block diagram schematically illustrating a configuration of a portable terminal with multiple receiving terminals according to an embodiment of the present invention.

FIG. 2 is a block diagram schematically illustrating a configuration of a portable terminal according to a second embodiment of the present invention.

Referring to FIG. 2, a portable terminal according to a second embodiment of the present invention may include MIMO antennas 10 and 20, a controller 110, a storage unit 120, a display unit 130, an input unit 140, a wireless communication unit 150, an audio processing unit 160, a broadcast receiving unit 270, and a switch unit 180. Elements or features of the portable terminal according to the second embodiment of the present invention that are substantially the same as those of the embodiment shown in FIG. 1 will not be explained to avoid repetition.

The broadcast receiving unit 270 according to an embodiment of the present invention may receive a broadcasting signal from at least one of the first antenna 10 and the second antenna 20. That is, the broadcast receiving unit 270 may include a first receiving terminal Rx1 for receiving a broadcasting signal from the first antenna 10 and a second receiving terminal Rx2 for receiving a broadcasting signal from the second antenna 20. The broadcast receiving unit 270 may combine a plurality of broadcasting signals when the plurality of broadcasting signals are received and transmit the combined broadcasting signal to the controller 110. For example, upon receiving broadcasting signals from the first antenna 10 and the second antenna 20, the broadcast receiving unit 270, according to an embodiment of the present invention, may combine the two received broadcasting signals to improve quality of the broadcasting signal. That is, the broadcast receiving unit 270 may use various diversity techniques such as space diversity, time diversity, frequency diversity, and polarization diversity.

The first switch 181 of the switch unit 180 may switch (connect or intercept) a path between the first antenna 10 and a first receiving terminal Rx1 of the broadcast receiving unit 270. The second switch 182 of the switch unit 180 may switch (connect or intercept) a path between the second antenna 20 and a second receiving terminal Rx2 of the broadcast receiving unit 270. A detailed operation of the switch unit 180 will be described with reference to the controller 110 later.

The controller 110 may control the switch unit 180 according to activation or deactivation of the broadcasting mode. When the broadcasting mode is deactivated, the controller 110 may control the first switch 181 and the second switch 182 to be turned off. In contrast, when the broadcasting mode is activated, the controller 110 may control the wireless communication unit 150 to measure RSSIs of the first antenna 10 and the second antenna 20. When the RSSIs of the first antenna 10 and the second antenna 20 are less than a stored reference value in the storage unit 120 to check a channel state, the controller 110 may turn on the first switch 181 and the second switch 182. That is, when a channel environment is not excellent, the controller 110 may control the broadcast receiving unit 270 to receive a plurality of broadcasting signals. Meanwhile, when an RSSI of at least one of the first antenna 10 and the second antenna is equal to or greater than the reference value, the controller 110 may compare the RSSIs between the first antenna 10 and the second antenna 20 and turn on a switch connected to an antenna with an excellent RSSI, and turn off the other switch. That is, when the channel environment is excellent, the controller 110 may control the broadcast receiving unit 270 to receive one broadcasting signal using the first antenna 10 or the second antenna 20.

Although not shown in FIG. 1 and FIG. 2, the portable terminal of the present invention may further include structural elements with an additional function such as a camera module for photographing images or moving images, a near distance communication module for near distance communication, a digital sound source playing module such as an MP3 module, and an Internet communication module for executing an Internet function. Because the structural elements may be modified according to a trend of a digital device, all elements are not described. Structural elements equivalent to the foregoing structural elements may be included in the portable terminal according to an embodiment of the present invention.

Figure 3:
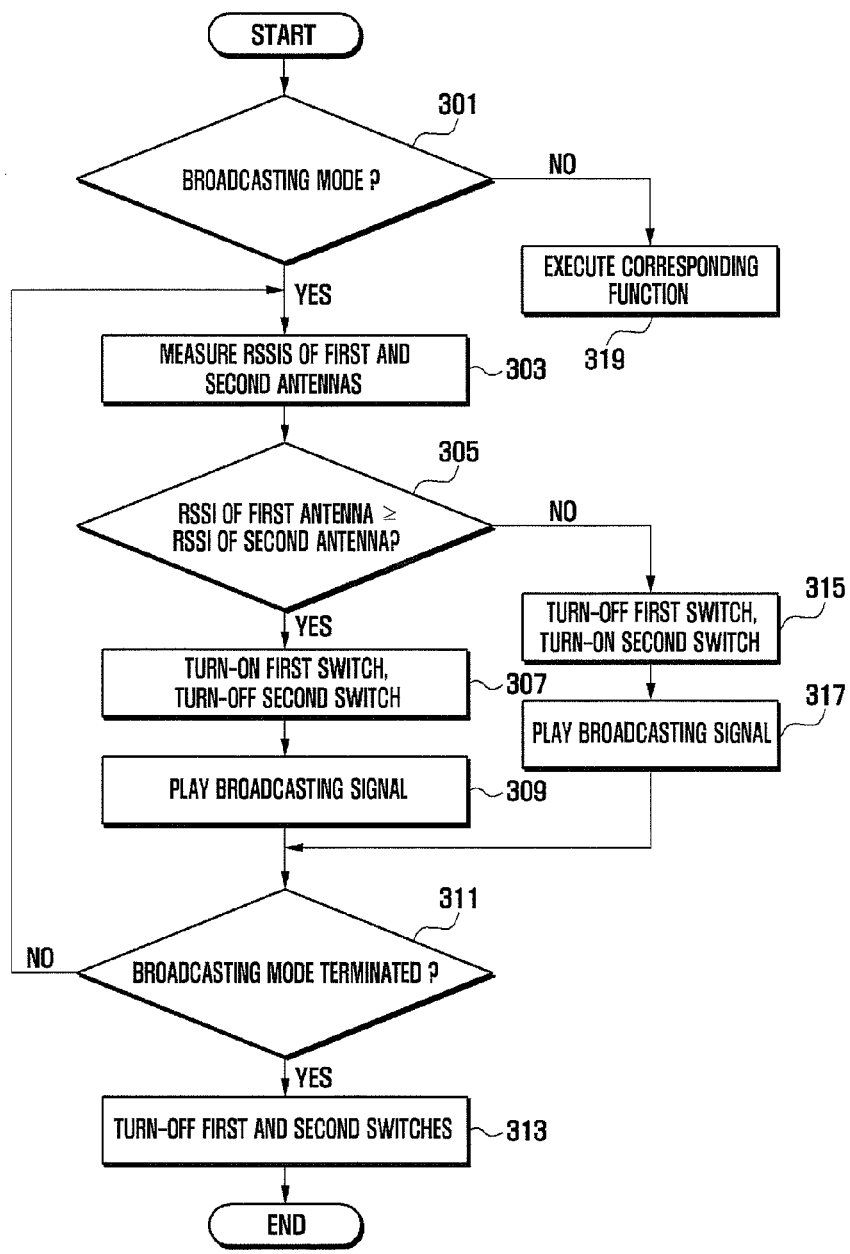
FIG. 3 illustrates a process for operating a MIMO antenna of a portable terminal with one receiving terminal according to an embodiment of the present invention.

FIG. 3 illustrates a process for operating a MIMO antenna of a portable terminal with one receiving terminal according to an embodiment of the present invention.

Referring to FIG. 1 and FIG. 3, a controller 110 may check whether or not a broadcasting mode is activated in block 301. The broadcasting mode may be activated by input of a set hot key or a function key or by a menu included in the portable terminal. When the broadcasting mode is deactivated, the controller 110 may execute a corresponding function in block 319. For example, the controller 110 may execute a music play function, a moving image play function, and a data transmitting/receiving function or maintain an idle state corresponding to user request. In contrast, when the broadcasting mode is activated, the controller 110 may measure RSSIs of the first antenna 10 and the second antenna 20 through the wireless communication unit 150 in block 303.

In block 305, the controller 110 may determine whether an RSSI of the first antenna 10 is substantially equal to or greater than an RSSI of the second antenna 20. When the RSSI of the first antenna 10 is substantially equal to or greater than the RSSI of the second antenna 20, the controller 110 may control the switch unit 180 such that the first switch 181 is turned on and the second switch 182 is turned off in block 307. In block 309, the controller 110 may play a broadcasting signal received through the first antenna 10. In contrast, when the RSSI of the first antenna 10 is less than the RSSI of the second antenna 20, the controller 110 may control the switch unit 180 such that the first switch 181 is turned off and the second switch 182 is turned on in block 315. In block 317, the controller 110 may play a broadcasting signal received through the second antenna 20.

In block 311, the controller 110 may determine whether a broadcasting mode termination signal is input through an input unit 140 or a touch screen. When the broadcasting mode termination signal is not input, the controller 110 may return to block 303. Namely, the controller 110 may periodically measure RSSIs of the first antenna 10 and the second antenna 20 and control the switch unit 180 to one of the antennas 10 and 20 and the broadcast receiving unit 170 according to the RSSIs. In contrast, when the broadcasting mode termination signal is input, the controller 110 may control the switch unit 180 such that a first switch 181 and a second switch 182 are turned off in block 313.

The embodiment of the present invention, as mentioned above, may receive and play a broadcasting signal using the antenna with a relative higher RSSI among a plurality of antennas—namely, the first antenna 10 and the second antenna 20—to improve broadcast receiving performance.

The foregoing embodiment has been described such that the controller 110 controls the switch unit 180, when the RSSIs of the first antenna 10 and the second antenna 20 are substantially the same, to receive a broadcasting signal using the first antenna 10. However, the present invention is not limited thereto. For example, when the RSSIs of the first antenna 10 and the second antenna 20 are substantially the same, the controller 110 may control the switch unit 180 to receive a broadcasting signal using the second antenna 20.

Figure 4:
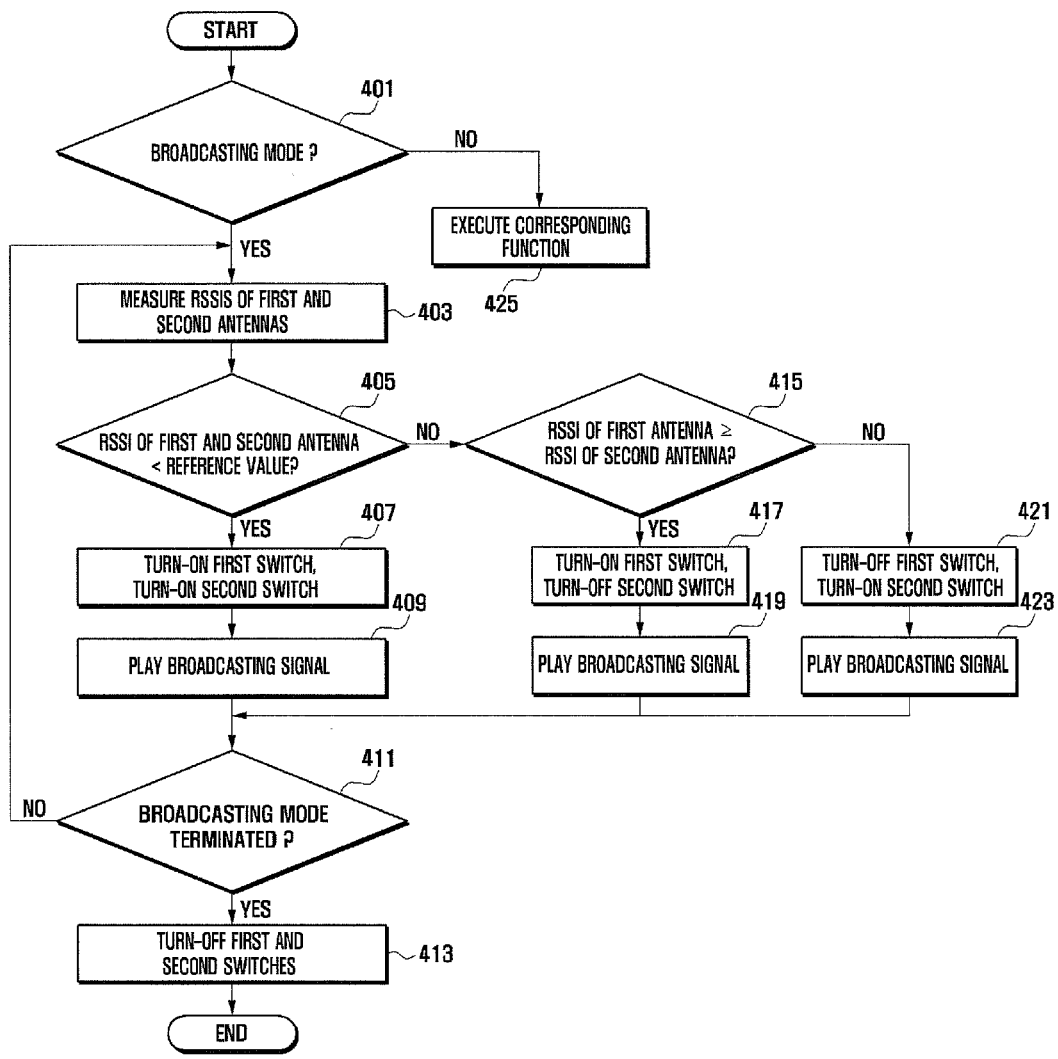
FIG. 4 illustrates a process for operating a MIMO antenna of a portable terminal with multiple receiving terminals according to an embodiment of the present invention.

FIG. 4 illustrates a process for operating a MIMO antenna of a portable terminal with multiple receiving terminals according to an embodiment of the present invention.

Referring to FIG. 2 and FIG. 4, a controller 110 may check whether or not a broadcasting mode is activated in block 401. The broadcasting mode may be activated either by input of a set hot key or a function key or by menus included in the portable terminal. When the broadcasting mode is deactivated, the controller 110 may execute a corresponding function in block 425. For example, the controller 110 may execute a music play function, a moving image play function, and a data transmitting/receiving function or maintain an idle state corresponding to user request. In contrast, when the broadcasting mode is activated, the controller 110 may measure RSSIs of the first antenna 10 and the second antenna 20 through the wireless communication unit 150 in block 403.

In block 405, the controller 110 may determine whether RSSIs of the first antenna 10 and the second antenna 20 are less than a set reference value. When the RSSIs of the first antenna 10 and the second antenna 20 are less than a set reference value, the controller 110 may control the switch unit 180 to turn on the first switch 181 and the second switch 182 in block 407. In block 409, the controller 110 may play two broadcasting signals received from the first antenna 10 and the second antenna 20. That is, the broadcast receiving unit 270 may combine the two broadcasting signals received from the first antenna 10 and the second antenna 20 and transmit the combined broadcasting signal to the controller 110. It may be preferred that the broadcast receiving unit 270, according to an embodiment of the present invention, supports a diversity technology such as a space diversity, a time diversity, a frequency diversity, and a polarization diversity capable of improving the quality of a signal.

In contrast, when an RSSI of at least one of the first antenna 10 and the second antenna 20 is equal to or greater than the reference value, the controller 110 may determine whether an RSSI of the first antenna 10 is equal to or greater than an RSSI of the second antenna 20 in block 415. When the RSSI of the first antenna 10 is substantially equal to or greater than the RSSI of the second antenna 20, the controller 110 may control the switch unit 180 such that the first switch 181 is turned on and the second switch 182 is turned off in block 417. In block 419, the controller 110 may play a broadcasting signal received through the first antenna 10. When the RSSI of the first antenna 10 is less than the RSSI of the second antenna 20, the controller 110 may control the switch unit 180 such that the first switch 181 is turned off and the second switch 182 is turned on in block 421. In block 423, the controller 110 may play a broadcasting signal received through the second antenna 20.

In block 411, the controller 110 may determine whether a broadcasting mode termination signal is input through an input unit 140 or a touch screen. When the broadcasting mode termination signal is not input, the controller 110 may return to block 403. That is, the controller 110 may periodically measure RSSIs of the first antenna 10 and the second antenna 20 and control the switch unit 180 to control the paths between antennas and the broadcast receiving unit 270 according to the RSSIs. In contrast, when the broadcasting mode termination signal is input, the controller 110 may control the switch unit 180 such that the first switch 181 and the second switch 182 are both turned off in block 413.

The embodiment of the present invention, as mentioned above, may receive and play a broadcasting signal using one antenna when an RSSI of at least one of the first antenna 10 and the second antenna 20 is equal to or greater than a reference value to prevent unnecessary battery consumption. When the RSSI of at least one of the first antenna 10 and the second antenna 20 is less than the reference value, an embodiment of the present invention may receive a plurality of broadcasting signals using multiple antennas to provide broadcasting service at a place where a channel state is relatively poor.

The foregoing embodiment has been described such that the controller 110 controls the switch unit 180 to receive the broadcasting signal using both of the first antenna 10 and the second antenna 20 when RSSIs of the first antenna 10 and the second antenna 20 are less than the reference value. However, the present invention is not limited thereto. For example, when the RSSIs of the first antenna 10 and the second antenna 20 are equal to or less than the reference value, the controller 110 of the present invention may control the switch unit 180 to receive a broadcasting signal using both of the first antenna 10 and the second antenna 20. Moreover, the foregoing embodiment has been described such that the controller 110 controls the switch unit 180 to receive a broadcasting signal using the first antenna 10 when the RSSIs of the first antenna 10 and the second antenna 20 are substantially the same. However, the present invention is not limited thereto. For example, when the RSSIs of the first antenna 10 and the second antenna 20 are substantially equal, the controller 110 of the present invention may control the switch unit 180 to receive a broadcasting signal using the second antenna 20. Furthermore, the foregoing embodiment has been described such that there are two MIMO antennas. The present invention is not limited thereto. That is, the MIMO antennas may include at least three antennas.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a portable terminal with multiple input multiple output (MIMO) antennas, the method comprising:

measuring received signal strength indications (RSSIs) of the MIMO antennas through a wireless communication unit that transmits and receives a wireless signal using the MIMO antennas;

connecting a path between a MIMO antenna with a greatest RSSI and a broadcast receiving unit during a broadcast mode; and intercepting all paths between the MIMO antennas and the broadcast receiving unit upon receiving a broadcasting mode termination signal.

2. The method of claim 1, wherein connecting the path between the MIMO antenna with the greatest RSSI and the broadcast receiving unit comprises controlling a switch unit to intercept paths between MIMO antennas other than the MIMO antenna with the greatest RSSI and the broadcast receiving unit.

3. The method of claim 1, further comprising:
  determining whether RSSIs of all MIMO antennas are less than a set reference value; and
  in response to RSSIs of all MIMO antennas being less than the set reference value, connecting paths between at least two MIMO antennas and the broadcast receiving unit.

4. The method of claim 1, further comprising:
  periodically measuring RSSIs of the MIMO antennas; and
  controlling a switch unit according to the RSSIs of the MIMO antennas to control paths between the MIMO antennas and the broadcast receiving unit.

5. The method of claim 1, further comprising playing a broadcasting signal received from the antenna with the greatest RSSI.

6. The method of claim 1, wherein the wireless signal comprises a frequency band associated with Long Term Evolution (LTE), and the broadcast mode comprises a broadcasting signal of a frequency band associated with Media Forward Link Only (MFLO).

7. The method of claim 6, wherein the frequency band associated with LTE includes the frequency band associated with MFLO.

8. A portable terminal with multiple input multiple output (MIMO) antennas, the portable terminal comprising:
  a wireless communication unit configured to transmit and receive a wireless signal through the MIMO antennas;
  a broadcast receiving unit configured to receive a broadcasting signal through the MIMO antennas;
  a switch unit provided between the MIMO antennas and the broadcast receiving unit and configured to connect and intercept paths between the MIMO antennas and the broadcast receiving unit; and
  a controller configured to measure RSSIs of the MIMO antennas through the wireless communication unit, and control the switch unit to connect a MIMO antenna with a greatest RSSI and the broadcast receiving unit during a broadcast mode, wherein the controller is further configured to control the switch unit to intercept all paths between the MIMO antennas and the broadcast receiving unit upon receiving a broadcasting mode termination signal.

9. The portable terminal of claim 8, wherein the controller is further configured to control the switch unit to intercept paths between MIMO antennas other than the MIMO antenna with the greatest RSSI and the broadcast receiving unit.

10. The portable terminal of claim 8, wherein the controller is further configured to control the switch unit such that the broadcast receiving unit is connected to at least two MIMO antennas when RSSIs of all MIMO antennas are less than a set reference value.

11. The portable terminal of claim 8, wherein the controller is further configured to periodically measure RSSIs of the MIMO antennas, and control the switch unit according to the RSSIs of the MIMO antennas to control paths between the MIMO antennas and the broadcast receiving unit.

12. The portable terminal of claim 8, further comprising a matching unit configured to match an impedance between the switch unit and the broadcast receiving unit.

13. The portable terminal of claim 8, wherein the wireless communication unit transmits and receives a wireless signal of a frequency band associated with Long Term Evolution (LTE), and the broadcasting receiving unit is further configured to receive a broadcasting signal of a frequency band associated with Media Forward Link Only (MFLO).

14. The portable terminal of claim 13, wherein the frequency band associated with LTE includes the frequency band associated with MFLO.

15. The portable terminal of claim 8, further comprising a display unit configured to display a broadcasting screen,
  wherein the controller is further configured to play a broadcasting signal received from the MIMO antenna with the greatest RSSI, and the broadcasting screen corresponds to the played broadcasting signal.

16. An apparatus in a portable terminal for operating a multiple input multiple output (MIMO) antenna, the apparatus comprising:
  a plurality of antennas of the MIMO antenna configured to transmit and receive wireless signals;
  a broadcast receiving unit configured to receive a broadcasting signal through the antennas during a broadcast mode;
  a wireless communication unit configured to transmit and receive wireless signals through the antennas and measure received signal strength indications (RSSIs) of the antennas;
  a switch unit configured to control a path between each MIMO antenna and the broadcast receiving unit; and
  a controller configured to control the switch unit according to the RSSIs of the antennas, to connect an antenna with a greatest RSSI and the broadcast receiving unit during the broadcast mode, to compare the RSSIs of the antennas with a reference value, and connect at least two antennas to the broadcast receiving unit when RSSIs of all the antennas are below the reference value.

17. The apparatus of claim 16, wherein the MIMO antenna is further configured to support diversity technologies comprising space diversity, time diversity, frequency diversity, and polarization diversity.

18. The apparatus of claim 16, further comprising a matching unit configured to match an impedance between the switch unit and the broadcast receiving unit.

19. The apparatus of claim 16, wherein the wireless communication unit is further configured to transmit and receive a wireless signal of a frequency band associated with Long Term Evolution (LTE), and the broadcasting receiving unit is further configured to receive a broadcasting signal of a frequency band associated with Media Forward Link Only (MFLO).

20. The apparatus of claim 19, wherein the frequency band associated with LTE includes the frequency band associated with MFLO.

* * * * *